United States Patent Office 2,808,934
Patented Oct. 8, 1957

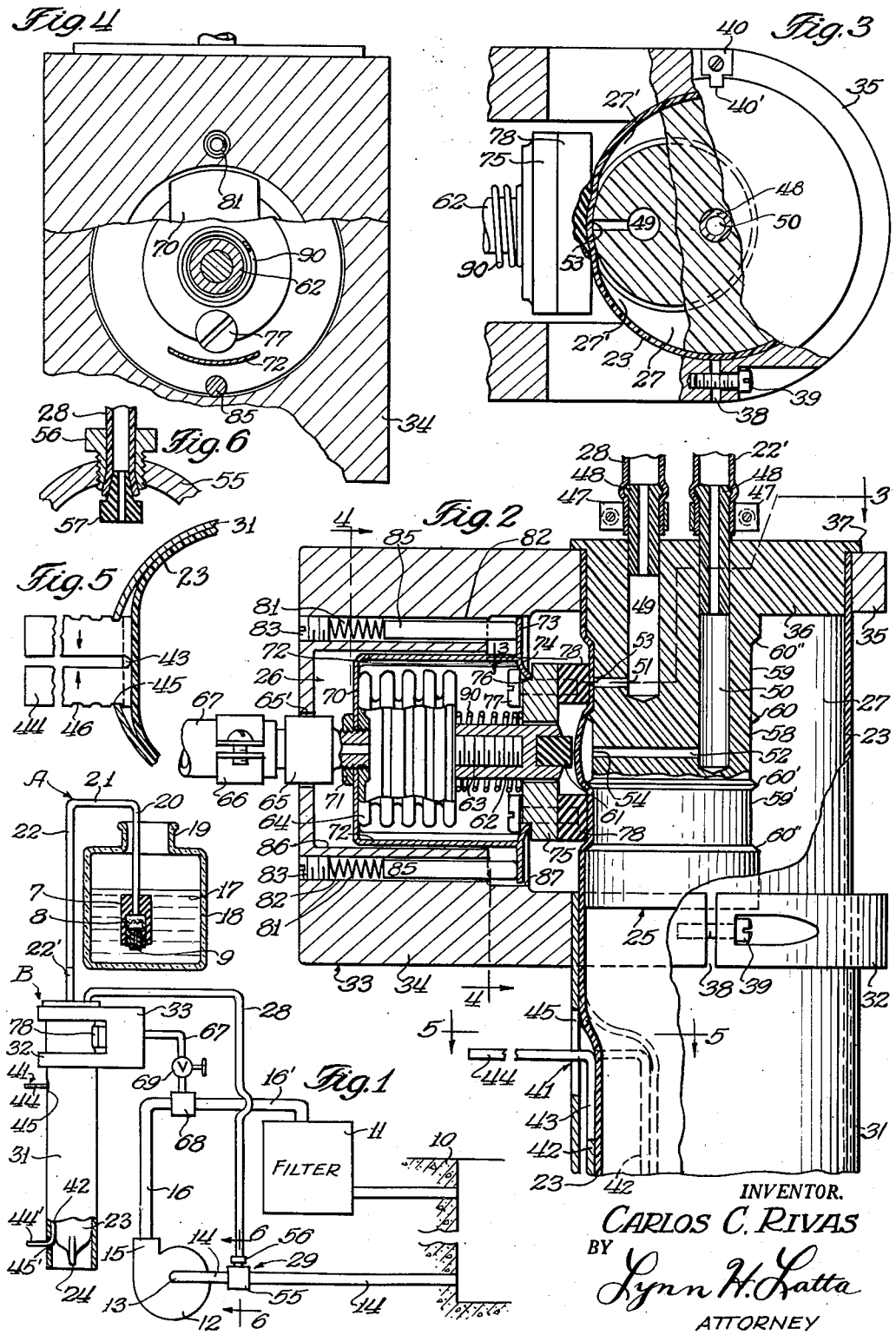

2,808,934

SWIMMING POOL CHLORINATOR

Carlos C. Rivas, Hollywood, Calif.

Application April 26, 1954, Serial No. 425,545

12 Claims. (Cl. 210—135)

This invention relates generally to apparatus for automatically measuring liquids, and specifically to apparatus for automatically and periodically measuring and injecting into the circulating system of a swimming pool, a small quantity of water treatment chemical such as a concentrated chlorine solution.

A general object of the present invention is to provide improvements in the additive injection apparatuses disclosed in my prior patent applications Serial Number 343,628, filed March 20, 1953, and Serial Number 369,399, filed July 21, 1953, of which applications the present application is in part a continuation.

More in detail, the present invention has as a general object to provide an automatic mechanism for measuring, out of a body of liquid in a storage container, a predetermined quantity of the liquid and transferring the same into a fluid system having means for intermittently circulating the fluid therein. In general, the invention contemplates an arrangement which utilizes fluid pressure differentials developed in the intermittent operation of the circulating mechanism of such a fluid circulating system, for transferring from a metering chamber into the system, a measured quantity of additive fluid to be mixed with the fluid in the system, and for subsequently recharging the metering chamber by filling it from a reservoir containing the additive fluid; said transfer and recharging operations occurring in step with the on and off stages of cycling action of the fluid circulating apparatus of the system, and in response to changes in pressure differential occurring in the change from the on to off operation and vice versa.

Specifically, the invention contemplates a fluid measuring apparatus including a metering unit and means associated therewith and operable in response to a pressure differential change in a fluid circulating system to withdraw from said metering unit and deliver into the fluid circulating system a measured quantity of additive fluid; and subsequently, in response to a pressure differential change in the opposite direction, to effect the refilling of the metering unit from a reservoir containing the additive fluid.

A particular object of the present invention is to provide an improved measuring apparatus of the type outlined above, especially characterized by simplicity of construction and low cost, combined with dependable operation over extended periods of time.

Another object of the invention is to provide such a measuring apparatus having means for preventing the entry of air into the fluid circulating system through the measuring apparatus in the event that, through carelessness, the reservoir of additive liquid should be allowed to become exhausted of its contents.

A still further object is to provide such a measuring apparatus having means to positively prevent any direct withdrawal of additive liquid from the reservoir into the fluid circulating system. Toward the attainment of these two objects, the invention contemplates a control valve unit having one position in which it is operable for routing the flow of additive fluid from the reservoir into the measuring chamber in one stage of operation; having another position in which it is operable for routing the flow from the measuring chamber into the fluid circulating system in another stage of operation; and having a third, intermediate position, attained in a transition stage of operation, in which it closes off all paths of flow between the reservoir and the fluid circulating system so as to avoid any short-circuiting of the metering unit. Specifically, the invention provides, in the control mechanism for the valve, a pressure differential responsive linkage adapted automatically to close all connections in the transition between one of the limit positions of the valve and the other limit position thereof.

An important object of the invention is to provide an injection apparatus utilizing a multiple position valve unit together with a differential pressure responsive control unit, acting directly in response to changes in the differential between atmospheric pressure and the pressure at the inlet side of the pump of the fluid circulating system, for controlling the positioning of said valve unit, a single pressure responsive element being utilized for actuating several individual valves embodied in the routing valve unit.

More specifically, the invention provides a measuring apparatus wherein the suction at the inlet of the circulating pump of the fluid system is utilized for inducing flow of the measured quantity of additive fluid from the metering unit into the fluid system, while pressure at the outlet of the pump is utilized for actuating the pressure responsive element which in turn actuates the routing valve to a position for directing flow from the metering unit into the fluid system while cutting off flow from the reservoir to the metering unit.

As a specific improvement upon the apparatuses shown in my earlier applications referred to above, the present invention has as a specific object to provide an improved chlorine concentrate measuring and injection apparatus for the circulating system of a swimming pool, wherein the routing valve and metering chamber are combined in a composite unit having a part of the valve mechanism sealed within the metering chamber; wherein the metering chamber is defined within a flexible bladder having portions of the wall thereof utilized as a part of the valve mechanism; and wherein the actuator parts of the valve mechanism are disposed externally of said metering chamber and thereby completely isolated from any possible contact with the corrosive chlorine solution which passes through the metering chamber and through the above referred to internal valve part.

Other objects will become apparent in the ensuing specifications and appended drawings in which:

Fig. 1 is a schematic view of a fluid circulating system equipped with an additive apparatus embodying the invention;

Fig. 2 is a detail sectional view of the major portion of my improved valve and metering chamber unit;

Fig. 3 is a view of the same, partially in plan and partially in transverse section as indicated by the line 3—3 of Fig. 2;

Fig. 4 is a detail sectional view taken in a vertical plane transversely of the valve actuator mechanism, as indicated by line 4—4 of Fig. 2;

Fig. 5 is a detail sectional view showing the volume adjustment for the metering chamber, taken on the line 5—5 of Fig. 2; and Fig. 6 is a detail sectional view of the connection between the injecting apparatus and the suction line of the swimming pool circulating system, taken on the line 6—6 of Fig. 1.

*The system to which the invention is applied*

Referring now to the drawings in detail I have shown, in Fig. 1, as an example of a circulating system to which the invention is especially applicable, a schematic disclosure of an intermittent re-circulating system for a swimming pool 10 of the type commonly built for private residential use. Shown schematically, the re-circulating system for the pool 10 includes a filter 11 for purifying water which is periodically withdrawn from the pool 10 and returned to the pool; and includes a pump 12 having an inlet 13 to which water coming from the pool 10 is delivered through the suction line 14; the pump 12 further having a discharge outlet 15 from which a return line 16, 16' is arranged to carry the water back to the pool. The filter 11 may be interposed in the return line 16, 16', or may be interposed in the suction line 14, depending upon the particular type of installation being dealt with. In either case, the invention is readily applicable to the system, as will appear more in detail hereinafter. The lines 14, 16 and 16' will hereinafter be referred to collectively as the "circulating line."

The invention in general

The invention utilizes several basic units which shall be referred to briefly and generally at this point. The additive (chlorine solution concentrate) to be injected into the fluid circulating system is indicated at 17, and is contained in a reservoir which is preferably of a simple nature, such as the five gallon bottle indicated at 18, by way of example. Thus the concentrate may come to the user in easily handled containers, the conventional neck 19 of the bottle being sealed by a suitable cap or cork which is removed to allow the insertion into the container of the receiving leg 20 of a siphon A. Siphon A includes a delivery leg 22 extending downwardly from a connecting portion 21 joining the upper ends of legs 20 and 22. The lower end of delivery leg 22 extends to a point somewhat below the level of the lower end of receiving leg 20, so that the concentrate may be delivered by siphoning action to the metering unit presently to be described. Attached to lower end of siphon arm 20 is a filter comprising a tubular body 7 the upper portion of which receives and is secured to the lower end of arm 20 and the lower portion of which has a counter-bore in which is mounted a cup shaped screen 8 secured in place by a tubular plug 9 driven thereinto.

The measuring apparatus of my invention utilizes a combined metering and routing valve unit, indicated generally at B. Unit B includes a bladder 23, closed at its lower end as indicated at 24 in Fig. 1, and defining a metering chamber 27 in which the actual measuring of a predetermined quantity of the concentrate 17 is effected; and a pressure differential responsive routing valve mechanism, which is best shown in Fig. 2. This routing valve mechanism includes a valve seat body, indicated at 25, pressure responsive valve actuator mechanism, indicated generally at 26, and flexible movable valve means consisting in a portion of the wall of bladder 23, as shown in Fig. 2.

In general, the routing valve mechanism is operative for alternately directing a charging flow of concentrate through siphon A into metering chamber 27, through a charging line 22' extending from siphon leg 22, to fill the chamber 27; and subsequently an injection flow from metering chamber 27 into the fluid circulating system, this injection flow being delivered through an injection line 28 and through a fitting 29 into the suction line 14 of the swimming pool circulation system.

The metering apparatus

The measuring of a predetermined quantity of concentrate is provided for by mechanism of maximum simplicity and reliability, consisting simply in the bladder 23 and a casing in the form of a tube 31, open at both ends, together with inlet and outlet connections and a volume adjusting device shortly to be referred to. Casing tube 31 may be a length of tubing of metal (e. g. aluminum) or hard plastic material or fibrous material impregnated with hardened synthetic resin plastic material, or other suitably durable rigid tubing, having its upper end clamped within a supporting collar 32 forming part of a yoke-shaped head 33. Head 33 includes a body portion 34 which constitutes a casing for the valve actuator mechanism 26, together with vertically spaced, horizontal arms comprising the collar 32 as the lower arm and a collar 35 as the upper arm.

The upper portion of bladder 23 traverses the space between collars 32 and 35, is received in collar 35, and is secured therein by a closure cap 36 which completely fills the area within the upper end of the bladder and seals the upper end of chamber 27. Cap 36 is formed as an integral portion of valve seat body 25, and has, at the upper end of this body, a marginal flange 37 which locates against the upper face of collar 35 to securely position valve body 25 with its major axis parallel to the major axis of tube 31. Thus the valve seat body 25 is properly positioned with reference to the valve actuator part which will be described hereinafter.

Fluid tight sealing of the upper end of bladder 23 is provided for by clamping collar 35 tightly around the upper end portion of the bladder wall and so as to seal the same against the periphery of cap 36 (bladder 23 functioning as a gasket between ring 35 and cap 36). To this end, ring 35 is split, at 38, and an end portion thereof adjacent split 38 is provided with a pocket to receive the head of a screw 39 which passes through an opening in this end portion and is threaded into a threaded opening in the adjoining portion of collar 35 as shown in Fig. 3. A similar clamping device, shown in Fig. 2, provides for tightly clamping ring 32 around the upper end of bladder casing to support the latter securely.

For accurately indexing the cap 36 to establish the proper position of valve seat body 25, there is provided a locating finger element 40, secured to collar 35, engaging in a notch 40' in the periphery of flange 37.

Adjustment of the volume of metering chamber 27 is provided for by a relatively simple adjustment device 41, of shallow yoke form, fabricated from a length of strap metal or other suitably rigid strap material, including a straight web portion 42 which lies between the wall of bladder 23 and the wall of casing tube 31, and including bifurcated end portions 43 which are bent at right angles and continued to form spaced fingers 44, 44' projecting radially outwardly through openings 45, and 45' in casing tube 31, and provided, in their remote sides, with notches 46 (Fig. 5), arranged in laterally opposed pairs and adapted to receive the edges of tube 31 defining openings 45, 45'. By grasping the fingers 44 in the operator's hand and squeezing them, they may be sprung together sufficiently to release the tube edges 31 from notches 46, whereupon the adjustment yoke 41 may be moved inwardly or outwardly (e. g. between the positions shown in full lines and dotted lines in Fig. 2). Web member 42, bearing against the wall of bladder 23, thus becomes effective to deflect a portion of the bladder inwardly to a varying extent, thus varying the volume of metering chamber 27. As indicated in Fig. 1, the adjustment yoke 41 may extend substantially the full length of casing 31 so as to provide for maximum volume of adjustment. During operation, the filling of the bladder with concentrate will cause it to press outwardly against web 42, so that the volume determined by the position of the adjustment device 41 will be accurate for each position of adjustment.

Charging lines 22' and injection line 28 are connected by any suitable means, such as clamps 47, to nipples 48 press fitted into fluid passage bores 49, 50 in valve seat body 25. Passages 49, 50 are connected by horizontal passages 51, 52 which extend to the side of valve body 25, opening through the side to define valve ports 53, 54 respectively.

Valve body 25 is eccentrically disposed with respect to cap 36, the outer diameter of valve seat body 25 being tangent to the periphery of cap 36, and thus tangent to the inner wall of bladder 23 in the common plane of passages 51, 52, in order that the wall of the bladder 23 may be utilized for sealing the ports 53, 54 along the line of tangency defined by the intersection of this plane with the wall of bladder 23. On either side of this line of tangency, between the opposed walls of valve body 25 and bladder 23, which diverge from one another in directions away from this line of tangency, there are defined flaring spaces 27' (Fig. 3) which provide passages into and out of chamber 27 from port 54 and to port 53 respectively.

Bladder 23 is of a soft, yielding, liquid impervious material, preferably a thermo-plastic resin which is inert to the corrosive action of a concentrated chlorine solution. A plasticized vinyl chloride is suitable for the purpose. Valve body 25, nipples 48 and tubes 28, 22' are likewise of a material inert to chlorine, and may be of a similar plastic resin, plasticized to a lesser extent, the nipples 48 and valve seat body 25 being of relatively rigid material.

Suction line connection 29, shown in detail in Fig. 6, comprises a sleeve 55 joining two sections of suction line 14, a connector nut 56 threaded through sleeve 55, and a hollow plug 57 inserted into the end of injection line 28 which extends through nut 56, the plug 57 being driven tightly into the end of tube 28 to secure it to the nut, and functioning as a non-corrosive delivery nozzle through which the concentrate may be delivered into the body of water flowing through sleeve 55, protecting nut 56 from corrosion. To this end, plug 57 is likewise of a non-corrosive material, such as a synthetic thermo-plastic resin of long chain polymeric organic amide type commonly known as the nylon resins and also referred to generally as the polyamide resins.

*Valve mechanism*

Valve body 25 is provided with a central, shallow annular groove 58 and a pair of similar outer grooves 59, 59', separated from groove 58 by annular ridges 60, 60', with annular shoulders 60" at their outer margins. Port 54, through which concentrate coming through charging line 22' enters the metering chamber 27, is adapted to be closed by a pressure pad 61, of a resilient compressible material, such as soft material having characteristics of resiliency and hardness comparable to those of the rubber in a pencil eraser. Pressure pad 61 is carried in a socket in the forward end of a plunger 62 the rear portion of which is in the form of a threaded socket, threaded onto a threaded stem 63 which is anchored to the forward, closed end of a bellows 64. Attached to the rear end of the bellows 64 and communicating with the interior of the bellows is a fitting 65 to which is connected in any suitable manner, as by means of a clamp 66, one end of a tube 67 constituting a pressure line. Fitting 65 extends freely through an aperture 65' in the rear wall portion of bellows housing 34. The other end of pressure line 67 is connected into the swimming pool circulating system at the pump outlet side thereof, as by means of a suitable fitting 68, interposed between conduit sections 16, 16'. Thus, when pump 12 is operating, its outlet pressure is conveyed to bellows 64 to expand the same, whereby its forward end may extend stem 62 forwardly causing pressure pad 61 to engage the wall of bladder 23, pressing it against port 54 between ridges 60, 60' to close the port 54.

There is preferably provided in pressure line 67 a valve 69, manually operable to close off communication between the pump outlet and the bellows 64 at such times as it may be desired to render the chlorinating apparatus inoperative.

The rear end of bellows 64 is secured to the central web portion of a yoke 70. To this end, the fitting 65 may pass through an aperture in said central web and be provided with a nut 71, threaded thereon and engaging the web to clamp it against the end of the bellows. The yoke includes diametrically opposed arms 72 extending forwardly and attached to a flat annular pressure plate 73 including a flange portion 74 of snout form which extends inwardly of arm 72 and is engaged against a pad carrier 75. Carrier 75 is in the form of a flat ring having a rearwardly projecting reduced diameter shoulder 76 which is piloted in the circular opening defined within flange 74. Pad carrier ring 75 is attached to flange 74 by several flat head screws 77.

Attached to the forward face of carrier ring 75 is a pressure pad 78 in the form of a flat ring defining therewithin a cylindrical cavity of sufficient diameter to receive the adjacent portions of ridges 60, 60' and the adjoining portions of bladder 23, interposed between ridges 60, 60' and the pad 78. Pressure pad 78 is of a compressible material similar to that of pad 61. Pads 61 and 78 are disposed on a common axis which is a radius of valve body 25. Passages 49, 50, 51, 52 lie in a common plane, which is the axial plane of body 25 on said radius, and thus includes the bellows axis. Thus, the pressure pad 61 is aligned with passage 52 and directly opposed to port 54, and pad 78 is arranged to have tangency with the bottom of groove 59 in direct opposition to port 53.

The outer diameter of pad 78 is somewhat less than the distance between the remote shoulders 60" of valve body grooves 59, 59', whereby the diametrically opposed portions of pad 78 lying in the plane of passages 51, 52 may be received in the grooves 59, 59'. That portion of pad 78 which is received in groove 59 is operative to press bladder 23 against port 53 to close the same. The groove 59' functions to receive the diametrically opposite portion of pad 78 when port 53 is being closed.

An important function of the annular ridges 60, 60' and the shoulders 60" at the outer extremities of annular grooves 59, 59', is to develop, from the pad pressure against the wall of bladder 23, an arching of the bladder wall away from the bottom of groove 58, when pad 61 is retracted, and pad 78 is pressed inwardly, and away from the bottom of groove 59 when pad 78 is retracted and pad 61 is pressed inwardly. The drawing illustrates this arching of the bladder wall away from the bottom of groove 58 for establishing maximum opening of port 54. Similarly, the bladder wall will be arched away from the bottom of groove 59 in the alternate positions of the valve actuating pads. This arching results from the tilting with a leverage action, of the portions of bladder 23 fulcrumed across ridges 60, 60', as the pad is pressed inwardly, the stiffness of the bladder wall being sufficient to cause torque to be transmitted to the areas on either side of ridges 60, 60' whereby the opposed areas are bowed outwardly. In the stage of operation illustrated in Fig. 2, these opposed areas constitute the respective sides of the portion of bladder 23 which traverses the groove 58, and in the alternate position of the parts, the opposed areas are the separated portions of bladder 23 lying over grooves 59, 59'. In the one case, the bladder is bowed away from port 54 and in the other case it is bowed away from port 53 (and also away from groove 59', this being merely incidental and not utilized). The bowing effect increases the area of a passage, extending tangentially of the bottom of groove 58 or 59, as the case may be, which establishes communication between port 54 or 53 and the metering chamber 27 through passages 27' above referred to.

Port 53 is normally closed (i. e. when bellows 64 is not subjected to pressure) by means of a plurality of coil springs 81 disposed in bores 82 in bellows housing 34 and engaged under compression between plugs 83 (threaded into the ends of bores 82) and the rear ends of plungers 85, the forward ends of the latter pressing against pressure plate 73 which transmits the pressure to pad carrier ring 75.

Yoke 70, 72 and bellows 64 are received within a cylindrical bellows chamber 86 in housing 34. Pressure plate 73 is accommodated in a counterbore 87 disposed between chamber 86 and the open space at the forward side of casing 34, between collars 32, 35. Bellows 64 is mounted for guided floating movement (at both ends) along its major axis. This may be provided for by piloting collar 73 in counterbore 87 and piloting the body portion of fitting 65 in aperture 65′ thus supporting both ends of the bellows assembly in centered relation to the axis of passage 52; or, alternatively, it may be accomplished by piloting the arms 72 of yoke 70 within the cylindrical bellows chamber 86 with sufficiently close fit to maintain the coaxial alignment of bellows and passage 52. In this connection it may be noted that the arms 72 have their outer faces formed as segments of a cylindrical surface which may be fitted to the cylindrical wall of chamber 86. In either case, fitting 65 is freely movable in aperture 65′ to allow rearward expansion of the bellows.

The forward end of bellows 64 is loaded by a coil spring 90 which is engaged under compression between said forward end and pad carrier ring 75 and surrounds plunger 62.

At this point it may be noted that fluid pressure applied internally of bellows 64 will tend to expand the bellows along the axis of the bellows assembly, the forward end of the bellows tending to move stem 62 forwardly toward valve body 25 against the compression load of spring 90, and the rear end of the bellows tending to move the yoke 70, 72 and the pad assembly 75, 78 carried thereby, in a rearward direction against the compression load of springs 81.

Operation

The apparatus has a cycle of operation which commences automatically when the pump 12 is started. Prior to this point, with the circulating system of the swimming pool inactive, minimum pressure will exist in bellows 64, the bellows will be collapsed under the pressure of spring 90, pressure pad 61 consequently will be withdrawn from bladder 23, and the pressure of springs 81, exerted through plungers 85, pressure plate 73, and pad carrier 75, will press bladder 23 against the bottom of groove 59 to seal port 53, thus closing off the injection line 28 and preventing flow from metering chamber 27 into the circulating system 10—16′. During this phase (recharging) the chamber has been filled, as will be explained more in detail hereinafter, and is ready to be emptied into the swimming pool circulating system.

When the pump 12 starts up, discharge pressure developed at the outlet 15 thereof will be transferred through pressure line 67 into bellows 64, which will expand, operating the valve mechanism in several stages as follows:

(1) *First transition stage of operation.*—When the pressure in bellows 64 has built up sufficiently to overcome the loading of spring 90, the latter will yield and plunger 62 will advance forwardly to press pad 61 against bladder 23, closing port 54. During this stage of movement, the loading of springs 81 remains sufficient to maintain pad 78 in its normal position closing port 53. When pad 61 has firmly pressed bladder 23 against port 54 to close the same, there will be a short interval during which both ports will remain closed. This is an important function of the apparatus, in that it completely separates the charging stage from the injection stage of delivering the contents of the bladder into the circulating system of the swimming pool, making it impossible for the suction of pump 12 to be applied to siphon A. If the apparatus were such as to allow the possibility of both valve ports 53 and 54 being open simultaneously during the operation of pump 12, it will be apparent that concentrate could be drawn from reservoir 18 into bladder 23 and thence directly on into the circulating system, thus completely nullifying the metering action of the metering unit 23—31. Accordingly, the invention provides for a positive closing of both valve ports during this transition stage of operation, to insure the isolating of the charging stage from the injection stage, which will now be described.

(2) *Injection stage.*—As the pressure builds up in bellows 64, plunger 62, its forward movement arrested by compression of pad 61 against bladder 23, will arrest the forward movement of the forward end of the bellows and provide an abutment against which the bellows will react so as to build up the load against yoke 70, 72, to the point where the spring load of springs 81 is overcome, whereupon yoke 70, 72 will move rearwardly, drawing pad assembly 75, 78 away from valve body 25, whereupon the torque set up in the wall of bladder 23 by the bowing of the bladder wall into recess 58, will cause the adjoining area of the bladder wall to bow away from recess 59, opening port 53 for the flow of concentrate from chamber 27 into suction line 14 of the swimming pool circulating system, establishing suction in chamber 27 (i. e. a differential of atmospheric pressure against the outside of the bladder over internal pressure) which will cause the bladder to collapse, and thereby cause its contents to flow through passages 51, 49 into injection line 28 and thence into suction line 14, until the bladder has been evacuated to a maximum limit established by the resistance of its extreme upper portion to full collapse into the top corner defined between the lower face of cap 36 and the valve seat body 25. This limit will be the same for each operation, and in the ensuing recharging operation, the volume of concentrate drawn into the bladder will be determined by the degree of evacuation which took place during the ejection stage.

(3) *Second transition stage.*—When operation of pump 12 is terminated, pressure in bellows 64 will drop until it is less than the spring load of springs 81, whereupon pad 78 will be advanced to seal port 53 while port 54 remains closed for an instant, whereby the communication between metering chamber 27 and suction line 14 is interrupted before communication between siphon A and metering chamber is reestablished. Thus the possibility of concentrate being drawn from container 18 through metering chamber 27 directly into suction line 14 is again circumvented at this transition stage. Equally important, the possibility of air being drawn into the circulating system (which would cause serious operational difficulties requiring troublesome and expensive corrective servicing) is likewise prevented, in this stage and also in the transition stage above described.

(4) *Recharging stage.*—As the pressure drops in bellows 64, a point is reached where it becomes less than the spring load of spring 90, which will then collapse the bellows, retracting pad 61. Thus port 54 is opened for the flow of concentrate from reservoir 18 through siphon A and recharging line 22′ into metering chamber 27. Such flow will take place by gravity acting on the column of fluid constantly present in the longer leg 22 of the siphon A, assisted by the inherent resiliency of bladder 23 tending to cause it to resume its normal cylindrical shape.

I claim:

1. A chlorinator operable in response to differentials of fluid pressure on respective sides of a pump in a swimming pool water supply line, comprising: a container for an additive chlorine solution; a bladder of flexible material chemically inert to said solution, for metering a volume thereof to be added to the swimming pool water supply line; means supporting the upper end of the bladder; a valve seat body extending downwardly into the bladder and having respective ports for connection to charging and transfer lines for filling said bladder from an additive container and for discharging the contents of said bladder to said supply line respectively; valve mechanism including pressure pads exteriorly engageable with said bladder in respective areas thereof registering with the respective ports and alternately operable to press said bladder against said valve seat body over the respective ports so as to close off communication between the respective lines and the interior of said bladder; and actuator means including a liquid pressure responsive element for communication with said supply line at the outlet side of said pump, and mechanical connections between the said pressure pads and said pressure responsive element, for actuating said valve mechanism to establish communication between said charging line and said bladder and to isolate said transfer line from said bladder when said pump is at rest, and to isolate said bladder from said charging line and communicate said bladder with said transfer line when said pump is operating.

2. For a liquid circulating system embodying a periodically operable mechanism including a pump and a circulating line connected thereto; apparatus for periodically transferring a measured volume of additive liquid from a container into said circulating line, comprising: an additive liquid container; a bladder of flexible material chemically inert to said additive liquid, for metering said volume, said bladder having an integral bottom closing its lower end and a mouth at its upper end; a cap closing said mouth; a valve seat body depending from said cap into said bladder adjacent one side portion thereof, said body having therein a pair of liquid passages terminating in ports in the side thereof adjacent said bladder side portion; one of said passages being adapted to be connected to a charging line, for filling said bladder from said container; the other of said passages being adapted to communicate with said circulating line at the inlet side of said pump, for transferring the contents of said bladder into said circulating line in response to suction developed at said inlet side when the pump is operating; valve mechanism including pressure pads exteriorly engageable with said bladder in respective areas thereof registering with said ports respectively, and alternatively operable to press said bladder against said valve seat body over the respective ports, so as to close off communication between the respective lines and the interior of said bladder; and actuator means including a liquid pressure responsive element adapted to communicate with said circulating line at the outlet side of said pump, and mechanical connections between the said pressure pads and said pressure responsive element, for actuating said valve mechanism to establish communication between said charging line and said bladder and to isolate said circulating line from said bladder when said pump is at rest, and to isolate said bladder from said charging line and to communicate said bladder with said circulating line when said pump is operating.

3. For a liquid circulating system embodying a periodically operable mechanism including a pump and a circulating line connected thereto; apparatus for periodically transferring a measured volume of additive liquid from a container into said circulating line, comprising: an additive liquid container; a bladder of flexible material chemically inert to said additive liquid, for metering said volume, said bladder having an integral bottom closing its lower end and a mouth at its upper end; a cap closing said mouth; a valve seat body depending from said cap into said bladder adjacent one side portion thereof, said body having therein a pair of liquid passages terminating in ports in the side thereof adjacent said bladder side portion, one of said passages being adapted to communicate with a charging line, for filling said bladder from said container; the other of said passages being adapted to communicate with said circulating line at the inlet side of said pump, for transferring the contents of said bladder into said circulating line in response to suction developed at said inlet side when the pump is operating; means supporting said bladder at its upper end with the body thereof pendant; valve mechanism including pressure pads exteriorly engageable with said bladder in respective areas thereof registering with said ports respectively, and alternatively operable to press said bladder against said valve seat body over the respective ports, so as to close off communication between the respective lines and the interior of said bladder; and actuator means including a liquid pressure responsive element in communication with said circulating line at the outlet side of said pump, and mechanical connections between the said pressure pads and said pressure responsive element, for actuating said valve mechanism to establish communication between said charging line and said bladder and to isolate said circulating line from said bladder when said pump is at rest, and to isolate said bladder from said charging line and to communicate said bladder with said circulating line when said pump is operating.

4. For a liquid circulating system embodying a periodically operable mechanism including a pump and a circulating line connected thereto; apparatus for periodically transferring a measured volume of additive liquid from a container into said circulating line, comprising: an additive liquid container; a bladder of flexible material chemically inert to said additive liquid, for metering said volume, said bladder having an integral bottom closing its lower end and a mouth at its upper end; a cap closing said mouth; a valve seat body depending from said cap into said bladder adjacent one side portion thereof, said body having therein a pair of liquid passages terminating in ports in the side thereof adjacent said bladder side portion; one of said passages functioning, for filling said bladder from said container; the other of said passages functioning for transferring the contents of said bladder into said circulating line in response to suction applied thereto when the pump is operating; means supporting said bladder at its upper end with the body thereof pendant; a casing tube attached at its upper end to said supporting means, extending downwardly therefrom around said bladder, and confining said bladder so as to establish said measured volume therein; valve mechanism including pressure pads exteriorly engageable with said bladder in respective areas thereof registering with said ports respectively, and alternatively operable to press said bladder against said valve seat body over the respective ports, so as to close off communication between the respective ports and the interior of said bladder; and actuator means including a liquid pressure responsive element adapted to communicate with said fluid line at the outlet side of said pump, and mechanical connections between the said pressure pads and said pressure responsive element, for actuating said valve mechanism to open said filling passage and to isolate said transfer ring passage from said bladder when said pump is at rest, and to isolate said bladder from said filling passage and to communicate said bladder with said transfer ring passage when said pump is operating.

5. Apparatus as defined in claim 4, including volume adjusting means operable between the inner wall of said casing tube and bladder to selectively displace said bladder inwardly for diminishing the volume thereof by varying fractions of said volume.

6. Apparatus as defined in claim 5, wherein said casing tube has an aperture therein, and wherein said volume adjusting means comprises a length of spring strap material having an elongated web portion interposed between the inner wall of said casing tube and the bladder, and having bifurcated end portions bent to provide a pair of spaced fingers projecting radially outwardly through said aperture and normally engageable with the casing tube at opposite sides of said aperture to grip the tube and secure said web portion in any selected position of inward spacing from said inner wall.

7. Apparatus as defined in claim 2, wherein said actuator means comprises a hollow body adapted to receive liquid under pressure from said pump outlet and expansible, in response to said liquid pressure, along an axis arranged generally in opposition to said valve ports; a stem interposed between one of said pressure pads and the near side of said hollow body and adapted, as the body expands, moving its near side forwardly, to first press said one pad against said bladder to close one of said ports and then to provide an abutment to support said near side of the hollow body so that a rise in pressure therein will result in backward movement of the remote side of said hollow body; a carrier for the other of said pads, connected to said remote side of said hollow body for moving said other pad away from contact with the bladder closing the other port; and means yieldingly urging said other pad toward said port closing contact and operable to establish such contact when said body is not subjected to said liquid pressure.

8. Apparatus as defined in claim 2, wherein said actuator means comprises a bellows expansible on an axis arranged generally in opposition to said valve ports; and having a pressure receiving connection at its end remote from said valve body; a stem attached at one end to the near end of said bellows and carrying one of said pads at its other end, said stem operating, as said near end of the bellows moves toward the valve body in response to bellows expansion, to first press said one pad against the bladder to close one of said ports and then to provide an abutment to support said near end of the bellows so that a rise in pressure in the bellows will result in backing off of the remote end of the bellows; the other pad being annular and in encircling relation to said one pad; a carrier yoke attaching said annular pad to said remote end of the bellows for retracting said annular pad from port closing contact with the bladder; and means yieldingly urging said other pad toward said port closing contact and operable to establish such contact when said bellows is not subjected to said liquid pressure.

9. Apparatus as defined in claim 2, wherein said actuator means comprises a floating bellows adapted to be subjected internally to pressure from said pump and expansible, in response to increase of said pressure, along an axis aligned with one of said valve ports; a stem disposed on said axis, carrying one of said pressure pads at its forward end and attached at its rear end to the near end of said bellows; a yoke attached to the remote end of said bellows and having arms extending toward said valve seat body around said bellows; the other pressure pad being carried by the inner ends of said arms, being of annular form, encircling said stem and said one pressure pad, and having an annular pressure face a circumferential segment of which is disposed in opposition to the other valve port; spring means exerting a spring load against said annular pressure pad and normally seating the same against said bladder over said other port; a coil spring surrounding said stem and engaged under compression between said near end of the bellows and said annular pressure pad and operative, when pressure in the bellows is at a minimum, to collapse the bellows and retract said one pad to the position where said one port is open, said spring having a loading of a smaller value than that of said spring means, whereby, in the expansion of said bellows in response to increasing pressure therewithin, said near end thereof will first be extended to move said one pad into port closing position, and said stem will then provide an abutment to support said near end so that further expansion of the bellows will result in backing off of said remote end, thereby retracting said annular pad so as to open the other port.

10. Apparatus as defined in claim 2, wherein said actuator means comprises a floating bellows adapted to be subjected internally to pressure from said pump and expansible, in response to increase of said pressure, along an axis aligned with one of said valve ports; a stem disposed on said axis, carrying one of said pressure pads at its forward end and attached at its rear end to the near end of said bellows; a yoke attached to the remote end of said bellows and having arms extending toward said valve seat body around said bellows; the other pressure pad being carried by the inner ends of said arms, being of annular form, encircling said stem and said one pressure pad, and having an annular pressure face a circumferential segment of which is disposed in opposition to the other valve port; a bellows housing having a bellows chamber enclosing said bellows; spring means exerting a spring load against said annular pressure pad and normally seating the same against said bladder over said other port; a coil spring surrounding said stem and engaged under compression between said near end of the bellows and said annular pressure pad and operative, when pressure in the bellows is at a minimum, to collapse the bellows and retract said one pad to the position where said one port is open, said spring having a loading of a smaller value than that of said spring means, whereby, in the expansion of said bellows in response to increasing pressure therewithin, said near end thereof will first be extended to move said one pad into port closing position, and said stem will then provide an abutment to support said near end so that further expansion of the bellows will result in backing off of said remote end, thereby retracting said annular pad so as to open the other port.

11. Apparatus as defined in claim 2, wherein said actuator means comprises a bellows adapted to be subjected internally to pressure from said pump and expansible, in response to increase in said pressure, along an axis arranged generally radially of said valve seat body and aligned with and in opposition to one of said valve ports; a bellows yoke to which the end of said bellows remote from the valve seat body is attached, said yoke having arms extending around the bellows and toward the valve seat body; an annular pressure plate attached to the forward ends of said arms; a casing including a bellows chamber in which said yoke is positioned and a counterbore in which said pressure plate is positioned, for floating movement of said bellows and yoke along said bellows axis; a stem interposed between one of said pressure pads and the near end of said bellows; and a coil spring surrounding said stem and interposed under compression between said near end of the bellows and said one pressure pad, for normally retracting said one end of the bellows and said stem when the pressure in the bellows is at a minimum, the other pad being an annular pressure pad carried by said pressure plate and arranged to have one side thereof pressed against the bladder over the other of said ports to close the same; said stem operating, as the bellows expands, with said near end moving forwardly, to first press said one pad against the bladder to close said one port while the other port remains closed, and to thereafter provide an abutment to support said near end of the bellows so that a rise in pressure in the bellows will result in backing off of the remote end of the bellows to retract said other pad away from the valve seat body to open said other port, said coil spring being of a lower load value than said spring means.

12. Apparatus as defined in claim 2, wherein said actuator means comprises a bellows adapted to be subjected internally to pressure from said pump and expansible, in response to increase in said pressure, along an axis arranged generally radially of said valve seat body and aligned with and in opposition to one of said valve ports; a bellows yoke to which the end of said bellows remote from the valve seat body is attached, said yoke having arms extending around the bellows and toward the valve seat body; an annular pressure plate attached to the forward ends of said arms; a casing including a bellows chamber in which said yoke is positioned and a counterbore in which said pressure plate is positioned, for floating movement of said bellows and yoke along said bellows axis; a stem interposed between one of said pressure pads and the near end of said bellows; and a coil spring surrounding said stem and interposed under compression between said near end of the bellows and said one pressure pad, for normally retracting said one end of the bellows and said stem when the pressure in the bellows is at a minimum, the other pad being an annular pressure pad carried by said pressure plate and arranged to have one side thereof pressed against the bladder over the other of said ports to close the same; said stem operating, as the bellows expands, with said near end moving forwardly, to first press said one pad against the bladder to close said one port while the other port remains closed, and to thereafter provide an abutment to support said near end of the bellows so that a rise in pressure in the bellows will result in backing off of the bellows to retract said other pad away from the valve seat body to open said other port, said coil spring being of a lower load value than said spring means; said spring means comprising a plurality of coil springs and respective plungers engaged between forward ends of said plurality of springs and said pressure plate, and said bellows housing having a plurality of bores, disposed radially outwardly of said bellows housing and parallel to said bellows axis, and opening into said counterbores, said plurality of coil springs and plungers being disposed in said bores; with the rear ends of said plurality of springs being abutted against the bottoms of said bores.

References Cited in the file of this patent

UNITED STATES PATENTS

| | | |
|---|---|---|
| 1,220,398 | Cox et al. | Mar. 27, 1917 |
| 1,577,157 | Averill | Mar. 16, 1926 |
| 1,680,103 | Hardy | Aug. 7, 1928 |
| 1,934,791 | Butzler | Nov. 14, 1933 |
| 2,162,074 | Everson | June 13, 1939 |
| 2,418,628 | Dodd | Apr. 8, 1947 |
| 2,447,031 | Rush | Aug. 17, 1948 |
| 2,541,799 | White | Feb. 13, 1951 |